Figure 8:
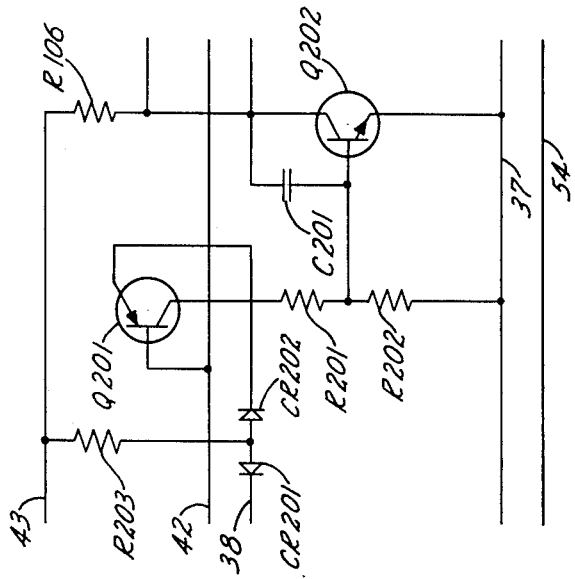

Feb. 2, 1965  H. D. MORRIS  3,168,680
SWITCHING DEVICE
Filed Sept. 2, 1960  3 Sheets-Sheet 1
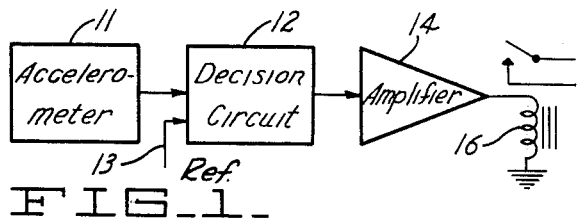
FIG_1_
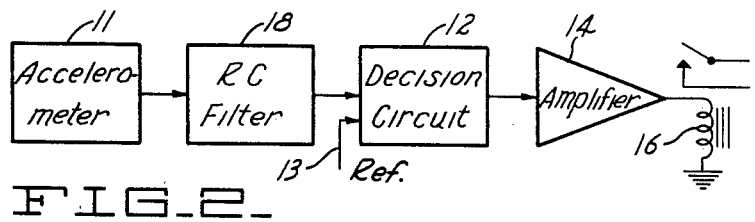
FIG_2_
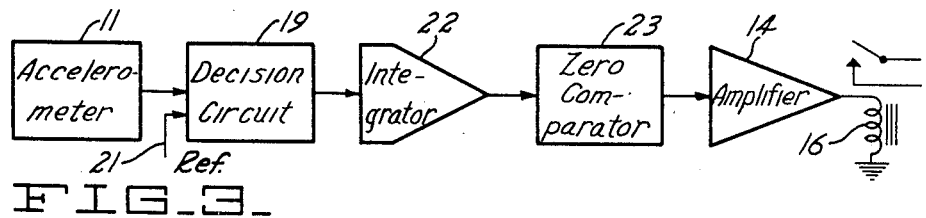
FIG_3_
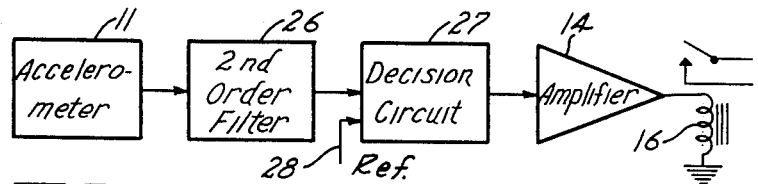
FIG_4_
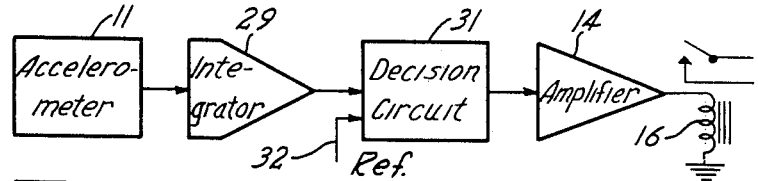
FIG_5_
INVENTOR.
Harold D. Morris.
BY
ATTORNEYS.

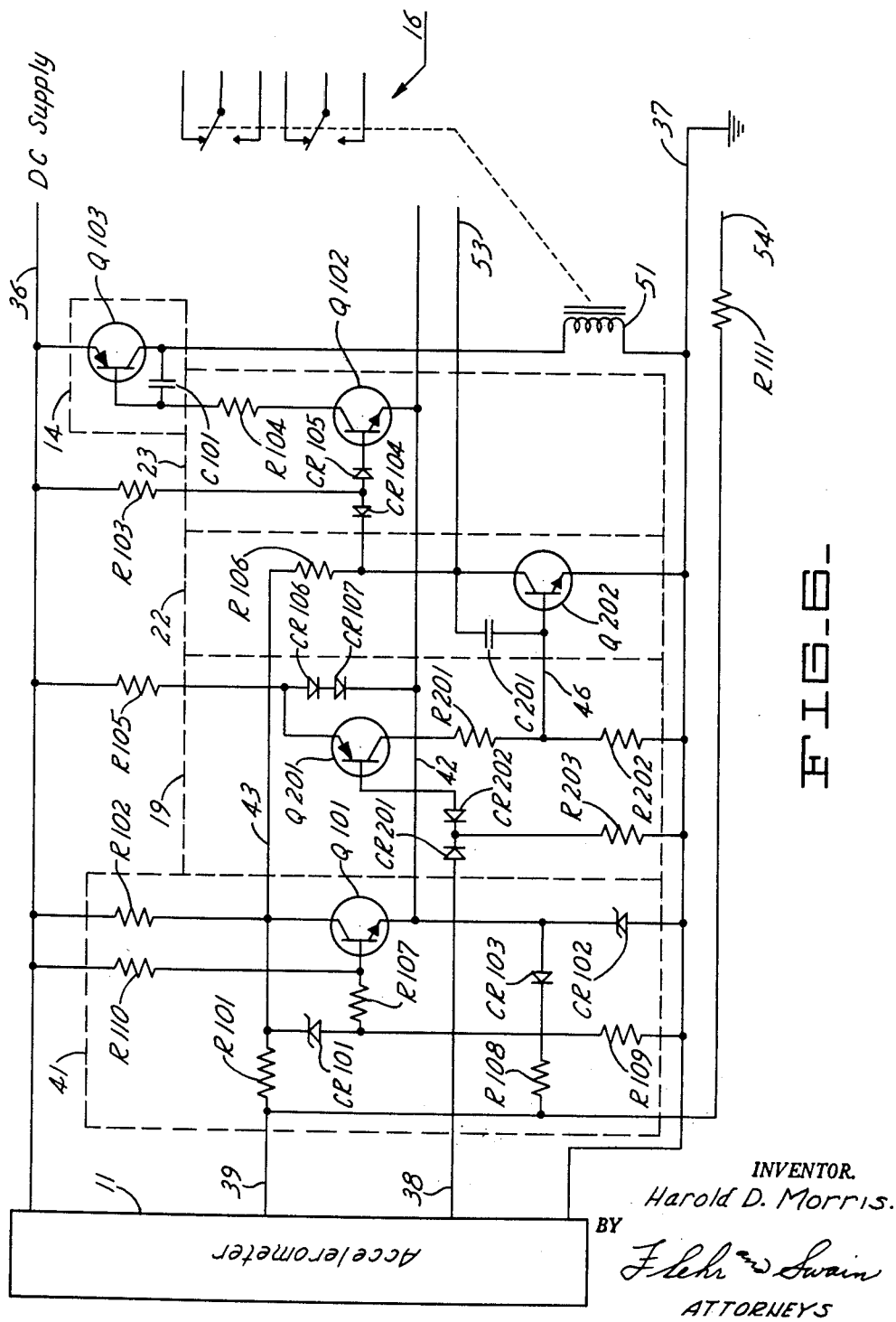

INVENTOR.
Harold D. Morris.
BY
ATTORNEYS

United States Patent Office 3,168,680
Patented Feb. 2, 1965

3,168,680
SWITCHING DEVICE
Harold D. Morris, Orinda, Calif., assignor to Systron-Donner Corporation, Concord, Calif., a corporation of California
Filed Sept. 2, 1960, Ser. No. 53,719
17 Claims. (Cl. 317—5)

This invention relates to a switching device and more particularly to a switching device for conducting a switching operation at a predetermined acceleration or velocity.

In the operation of a missile, it is often necessary to actuate a switch contact as the input acceleration or velocity reaches a predetermined value. Switching devices heretofore provided for such a purpose have not been completely satisfactory because their operation has not been independent of the great amount of vibration which occurs in the missile during the time that it is accelerating. The problem has been complicated by the fact that the vibration of the missile during this period of time imposes shock and vibration forces on the switching device which are generally greater than the force upon which the device is supposed to actuate. Attempts have been made to average out the vibration by damping the accelerometer utilized in such devices. This has not been completely satisfactory because, as is well known to those skilled in the art, the use of such damping reduces the sensitivity of the device. In particular, such damping increases the time required for recovery from overload and greatly increases the time required for checking out the operation of the switching device before launching of the missile. In addition, when oil is used for damping, the viscosity of the oil changes greatly under the variations in temperature which are encountered by the device. There is, therefore, a need for a new and improved switching device which can be utilized for accomplishing a switching operation when the input acceleration reaches a predetermined value or when the velocity reaches a predetermined value.

In general, it is an object of the present invention to provide a switching device which will switch accurately at a predetermined acceleration or a predetermined velocity.

Another object of the invention is to provide a switching device of the above character which will switch accurately substantially independent of shock or vibration applied to the device.

Another object of the invention is to provide a switching device of the above character which has very high reliability.

Another object of the invention is to provide a switching device of the above character which will always operate in a predetermined time interval in the presence of a predetermined average acceleration or predetermined average velocity.

Another object of the invention is to provide a switching device of the above character which is substantially independent of variations in temperature.

Additional objects and features of the invention will appear from the following description in which the preferred embodiments are set forth in detail in conjunction with the accompanying drawings.

Figure 7:
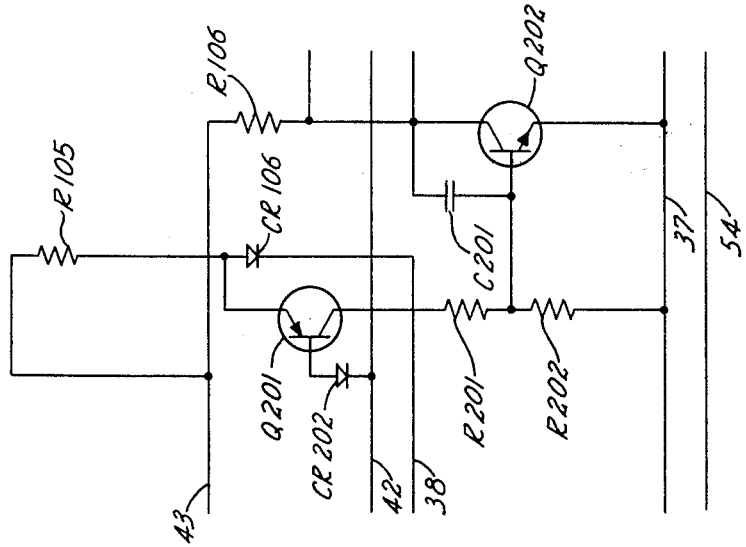

Referring to the drawings:
FIGURE 1 is a block diagram of a switching device incorporating the present invention.
FIGURES 2, 3, 4 and 5 are each block diagrams of other embodiments of my switching device.
FIGURE 6 is a detailed circuit diagram of the switching device shown in block diagram form in FIGURE 3.
FIGURE 7 is a portion of a detailed circuit diagram showing a modification of the switching device shown in FIGURE 6.
FIGURE 8 is a portion of a detailed circuit diagram showing another modification of the switching device shown in FIGURE 6.

In general, my switching device consists of means for measuring acceleration, reference means, and decision means connected to the means for measuring acceleration and the reference means for producing a signal when the output from the means for measuring acceleration is greater or less than the output from the reference means.

In FIGURE 1, I have shown in block diagram form one embodiment of my switching device. It consists of an accelerometer 11 which is of the type described in my copending application Serial No. 794,487, filed February 4, 1959, and entitled "Position Detecting Transducer," now Patent No. 3,074,279. The accelerometer provides an output which is determined by the acceleration applied to it. This output is supplied to a decision circuit 12 which utilizes a reference 13. The decision circuit 12 is, in effect, like a voltage comparator as hereinafter described and provides no output unless the input supplied to it by the accelerometer 11 exceeds the reference 13. It is thus apparent that the reference 13 can be adjusted to a value which represents the predetermined acceleration at which it is desired to cause operation of the switching device. Thus, when the output from the accelerometer 11 exceeds that of the reference 13, a signal will be supplied to the amplifier 14 which amplifies the output and causes energization of the coil of the relay 16 to cause actuation of the contacts of the relay.

In the embodiment shown in FIGURE 1, the filtering has been restricted to mechanical filtering which is applied to the accelerometer 11. The mechanism within the accelerometer 11 has been damped by filling the accelerometer with oil. Such a switching device has operated very satisfactorily.

Another embodiment of my invention is shown in FIGURE 2. It is similar to the embodiment in FIGURE 1 with the exception that an RC filter 18 is interposed between the accelerometer 11 and the decision circuit 12. The RC filter 18 is of a conventional passive type and is provided for the purpose of supplementing the filtering provided by the mechanical filtering in the accelerometer 11. The RC filter 18 ensures that the vibration or shock forces applied to the switching device are attenuated sufficiently so that they do not cause premature operation of the switching device.

In FIGURE 3 is shown another embodiment of my switching device in which the output of the accelerometer 11 is supplied to a decision circuit 19 utilizing a reference 21. The output of the decision circuit 19 is supplied to an integrator 22, the output of which is supplied to a zero comparator 23. The output of the comparator 23 is supplied to the amplifier 14 which is connected to the relay 16.

The integrator 22 is used to provide a time delay so that the decision circuit 19 must supply a signal of a certain type as hereinafter explained for a predetermined period of time before the relay 16 is operated. The operation of the switching device shown in FIGURE 3 will be described in detail in conjunction with the detailed circuit diagram shown in FIGURE 6.

Another embodiment of my switching device is shown in FIGURE 4 in which the output of the accelerometer 11 is supplied to a second-order filter 26. The second-order filter 26 is an electronic filter of the type described in my copending application Serial No. 791,210, filed February 4, 1959, and entitled "Electronic Filter," now Patent No. 3,122,714. This filter is of the active type rather than the passive type shown in FIGURE 2. Such filters have displayed very desirable characteristics and are particularly adapted for use in my switching device. For example, they can be readily designed to eliminate all frequencies above two cycles per second thereby essentially eliminating all vibrational components in the acceleration signal. The output of the filter 26 is supplied to the decision circuit 27 which utilizes a reference 28. The output of the decision circuit is supplied to the amplifier 14 which is connected to the relay 16. The switching device shown in FIGURE 4 has an advantage over the one shown in FIGURE 3 because there is not as much time delay associated with the circuit as with the circuit shown in FIGURE 3.

In FIGURE 5 is shown another embodiment of my invention showing how the circuits in FIGURES 1, 2, 3 and 4 can be utilized as velocity switches instead of acceleration switches. The output of an accelerometer 11 is supplied to an integrator 29 which serves a dual function. The integrator 29 provides filtering and, in addition, integrates the output of the accelerometer 11 to provide a signal which represents velocity rather than acceleration. The signal representing velocity is supplied to a decision circuit 31 utilizing a reference 32. As soon as the velocity signal exceeds the reference 32, an output is supplied by the decision circuit 31 to the relay amplifier 14 which operates the relay 16.

In all of the embodiments in FIGURES 1 through 5, it is preferable to eliminate or minimize vibrational components down to five cycles per second. However, it is only in the embodiment shown in FIGURE 1 that relatively heavy damping is required in the accelerometer itself. In the embodiment shown in FIGURE 1, this damping is accomplished by utilizing a relatively heavy fluid in the accelerometer. In each of the additional embodiments, additional filtering means is provided so that heavy damping is not required in the accelerometer. In the embodiments in FIGURES 2 through 5, filtering is actually accomplished by cascading the filtering means after the accelerometer. When such is the case, a relatively wide band accelerometer can be used with normal damping with the primary characteristics of the switching device for rejection of vibration being determined by the filter rather than by the damping provided in the accelerometer. This makes the rejection of vibration relatively independent of temperature which is not the case when heavy oil damping is utilized in the accelerometer because as is well known to those skilled in the art, the viscosity of oil changes greatly with the changes in temperature.

If desired, all of the accelerometers can be oil filled. However, where the oil is not relied upon for providing damping, the oil can be relatively light. The oil in such a case is provided to make the accelerometer more rugged with only nominal independence of vibration.

Although a relay 16 and relay amplifier 14 have been shown in each of the block diagrams in FIGURES 1 through 5, it is readily apparent that, if desired, other types of switching means can be utilized to accomplish the same result. For example, if desired, a semiconductor switch such as a four-layer semi-conductor diode can be utilized. As is well known to those skilled in the art, such a diode is voltage sensitive and can provide a pulse for the actuation of a device.

As explained previously, FIGURE 6 is a circuit diagram of the switching device shown in block diagram form in FIGURE 3. The accelerometer 11 is shown in block diagram form because it is described in detail in my copending application Serial No. 794,487, filed February 4, 1959. The accelerometer 11 is connected to a suitable D.-C. supply such as +30 volts D.-C. by a line 36. It is also connected to ground by a line 37. The signal output of the accelerometer is supplied on the conductor 38 to the decision circuit 19. A conductor 39 completes the load circuit to the accelerometer.

A power supply and regulator 41 is provided as a part of the switching device and consists of a Zener diode CR102 which produces a first voltage on line 42 of a suitable value such as a plus 8 volts. A transistor Q101 produces a second voltage on line 43 of a suitable value such as a plus 18 volts. This latter or second voltage is a regulated voltage which is regulated by the transistor Q101. The base of the transistor Q101 is controlled by a Zener reference diode CR101. This Zener diode operates so that the output voltage on line 43 is maintained substantially constant. For example, if the voltage at the collector of the transistor Q101 tends to rise, the Zener diode CR101 increases the voltage on the base of the transistor Q101 and thus brings the voltage on the collector back to the normal or the predetermined second voltage.

It is therefore, apparent from the foregoing description that there is present in the circuitry in FIGURE 6, ground which appears on line 37, a first voltage which appears on line 42, a second voltage which appears on line 43, and a third voltage which is the D.-C. supply voltage which appears on line 36.

The Zener diode CR102 serves as a shunt regulator because it is in parallel with the output load of the power supply as is the transistor Q101.

All of the current for the power supply and regulator comes in through the resistor R102 connected to the D.-C. supply line 36. The current passing through the transistor Q101 and the load in parallel with it which provides a majority of the operating current for keeping the Zener diode CR102 in an operating condition.

The resistors R110 and R107 form a divider network which inserts a voltage into the regulator and power supply to make the regulator and power supply 41 independent of line voltage. For example, if the D.-C. voltage on line 36 should, for example, drop from a +30 volts to a +27 volts, the voltage on the line 43 would also have a tendency to drop in voltage. When this occurs, the voltage fed through the divider consisting of the resistors R110 and R107 would cause the voltage on the base Q101 to drop even further than it would normally and thereby would return the output voltage on the collector back to its normal predetermined value. The divider network therefore, compensates for changes in line voltage to maintain the voltages within the switching device essentially independent of the incoming line voltage.

Resistor R101 is a load resistor for the accelerometer 11 and is normally adjusted to calibrate the acceleration switch for the proper switching point. The accelerometer is normally oriented so that the voltage on the left-hand side of the resistor R101 as viewed in FIGURE 6 goes negative with respect to the right side upon acceleration in a forward direction.

When the acceleration equals and exceeds the tripping or switching point of the succeeding amplifiers, as hereinafter explained, the voltage on the left-hand side of the resistor R101 comes to the point where resistor R103 and diode CR103 conduct to the line 42 carrying the first voltage and provide increased current for the accelerometer. The resistor R103 and the diode CR103, therefore, provide overload capacity for the switching device so that the accelerometer 11 will pull in more quickly, that is, the increased current will act upon the restoring coil to move the paddle more quickly to the desired position and operate in a higher acceleration or higher G environment than the switching point for which the switching device is set. The resistor R103 and the diode CR103, therefore, provide a switching device which gives a greatly increased range to the accelerometer. It, in effect, makes it possible to use a much larger voltage to represent the normal switching point of the switching device. Upon reaching the switching point, the remainder of the range of the switching device is compressed into the remainder of the voltage available. In actuality, the switching range is magnified and the other range, which is provided only for overload capacity, is compressed. The resistor R103 and the diode CR103, therefore, makes possible very accurate operation at the switching point of the switching device.

The resistor R109 in the power supply and regulator 41 provides a path for current flow to keep the Zener diode CR101 in a reasonable operating condition. For example, if it is assumed that the current through the correction divider network comprised of resistors R107 and R110 is small in comparison, then the primary current flowing through the Zener diode CR101 will be supplied by the resistor R109.

The decision circuit 19 consists of the transistor Q201 and its associated components. When the acceleration is zero, the current throughout the transistor Q201 will be zero. When this is true, the current flow through conductors 38 and 39 will also be zero. Thus, when there is no acceleration, the voltage on conductor 38 will be equal to the second voltage which is on line 43.

The emitter of the transistor Q201 is biased to very near the voltage level appearing on the conductor 42 by the biasing network consisting of the resistor R105 and diodes CR106 and CR107. For example, in one embodiment, the transistor Q201 was biased approximately 1.2 volts above the 8 volts on line 42 with .6 of a volt drop between emitter and the base of the transistor Q201 so that the base of the transistor Q201 was approximately 8.6 volts above ground.

A diode network consisting of first and second diodes CR201, CR202 and resistor R203 is provided and serves as a gate so that the current flowing through resistor R203 will be supplied either by CR201 or CR202 depending upon which diode is returned to the higher voltage source. Thus, for example, if the voltage on line 38 is at +18 volts (the condition when there is no acceleration) or at the same voltage as the second reference voltage, then this voltage is obviously larger than the first reference voltage (approximately 8.6 volts) appearing on the base of the transistor Q201. Thus, when this is the condition, the current flowing in resistor R203 will be supplied by diode CR201 because diode CR202 is reverse biased and will be non-conducting. For that reason, there will be no current flowing in the base of the transistor Q201. When there is no current flowing in Q201, there will be no current flowing in the resistor R201 in the collector circuit of the transistor Q201.

The resistor R201 in the collector circuit of the transistor Q201 is connected to a conductor 46 which is connected to the integrator 22. It is also connected to a resistor R202 which is connected to the ground lead 37. The integrator 22 is actually an integrating amplifier and is comprised of the transistor Q202 and the capacitor C201 which is connected between the collector and base of transistor Q202. The collector of the transistor Q202 is connected to the second reference voltage appearing on line 43 through a load resistor R106.

The zero comparator 23 consists of the transistor Q102, the collector load resistor R104, and the diode network consisting of first and second diodes CR104, CR105 and the resistor R103. The amplifier 14 consists of the transistor Q103 and the capacitor C101 connected between the collector and base elements of the transistor. Capacitor C101 serves to suppress spurious amplifier oscillations. The emitter of the transistor Q103 is connected to the D.-C. supply line 36, whereas the collector is connected to one side of the winding 51 of the relay 16. The other side of the winding is connected to the ground lead 37 as shown. The relay 16 is provided with a plurality of contacts which have been numbered 1 through 6. As can be seen, certain of the contacts are normally open, whereas others of the contacts are normally closed. The switching device is provided with a plurality of test terminals 53 and 54. The resistor R111 permits a predetermined current flow representing an acceleration signal greater than that required to meet the switching point when the line 54 is grounded to permit testing of the acceleration switch without physically accelerating it.

Operation of the switching device shown in FIGURE 6 may now be briefly described as follows. Let it be assumed that the switching device is of a type which operates on decreasing acceleration. The initial starting condition of all the components is as follows, that is, when there is maximum acceleration applied to the device, transistor Q201 is on, transistor Q202 is on and in a reset condition. Transistors Q102 and Q103 are turned off because the driving current for Q102 can come only from the D.-C. supply line 36 through the resistor R103. Current will flow through the resistor R103, diode CR104 and transistor Q202 to apply reverse bias to the diode CR105 and prevent current flow to the base of transistor Q102.

When the accelerometer 11 has an output which drops below the predetermined switching level, Q201 will be turned off and the two transistors Q201 and Q202 will be turned on with Q101 regulating the second reference voltage appearing on line 43.

As the vehicle carrying the switching device loses forward acceleration, the voltage on line 38 will begin rising from near ground towards the switching point which is in the vicinity of the voltage appearing on the line 42 since the transistor amplifier Q201 is biased to very near this voltage level by the biasing network consisting of the resistor R105, and the diodes CR106 and CR107. As the voltage on line 38 continues to increase (the current decreases) as the accelerometer decreases its output, the differential in voltage supplied to the two diodes CR201 and CR202 decreases. When the voltage applied to the diode CR201 rises above the first reference voltage applied to diode CR202, the current supply for the resistor R203 will come through the diode CR201 to remove the drive from transistor Q201. This will reverse the drive applied to the transistor Q202 due to the lack of a saturating input from the resistor R201. Current will flow away from the input of the transistor Q202, that is, away from the base to ground through the resistor R202. The transistor Q202 will be turned off because of the current flowing through resistor R202 as hereinafter described.

The collector of the transistor Q202 will, therefore, begin running up on a ramp function of voltage searching for the second reference voltage appearing on the line 43. This voltage is stored in the capacitor C201. If this condition were uninterrupted, the collector would rise in voltage until it reached the plus 18 volts. However, as the collector of the transistor Q202 passes through the reference voltage represented by the base voltage or zero reference voltage of the transistor Q102, which is the same as the base voltage on transistor Q201, the current will suddenly switch from flowing through the diode CR104 to flowing through the diode CR105 into the base of the transistor Q102. This current is multiplied by the gain of the transistor Q102 and is supplied to the transistor Q103 which amplifies the current to a point so that the relay 16 can be operated very easily.

In the foregoing description of the operation of my switching device it should be remembered that although the accelerometer 11 produces a slowly changing signal, or in other words, an output which is directly proportional to the applied acceleration, there is superimposed upon this slowly changing output the effects due to vibration and shock which will be in the form of relatively high frequency voltage excursions above and below the linear output voltage of the accelerometer. This output of the accelerometer is supplied to the decision circuit 19 which continuously compares the accelerometer output with the reference voltage which is the voltage appearing on the base of the transistor Q201. When the accelerometer output is below the reference voltage, the transistor Q201 is conducting and supplies a constant positive output for all accelerations below the reference voltage. When the output from the accelerometer is sufficient to bring the voltage applied to the diode CR201 above the voltage applied to the diode CR202, the transistor Q201 of the decision circuit 19 will be turned off, resulting in a constant negative input to the integrator 22 due to current flow in resistor R202. Current flows in resistor R202 of the inherently constant base to emitter voltage of silicon transistor Q202.

Thus, it can be seen that the decision circuit 19 will be switched "on" and "off" in accordance with the voltage variations in the output of the accelerometer as applied to the line 38. Each time the diode CR201 stops conducting, the transistor Q201 will begin conducting to cause saturating current to be applied to the transistor Q202 to cause the decision circuit to be switches "off" which, in turn, causes discharging of the capacitor C201. Conduction of Q201 and Q202 represents the reset state and, therefore, this condition can be defined as an "off" condition. As long as the decision circuit 19 spends a greater amount of time "off" than it does "on," the charge on capacitor C201 will be dissipated each time and the collector of the transistor Q202 will have to start as substantially zero each time in generating the ramp function of voltage.

In other words, the integrator 22 begins at a reset state which represents negative saturation voltage for the transistor Q202. The input to the integrator when the decision transistor Q201 is conducting tells the transistor Q202 to go further into saturation and this continues up to the time the decision circuit reverses and indicates that the vibration superposed upon the linear acceleration signal has begun peaking over the acceleration reference voltage. As this commences to occur, the integrator will begin running upwards towards the switching point during the time that the input wave form exceeds the reference value. The integrator will run back towards zero during the time interval that the signal is below the switching point. This means that the integrator will always end up in the reset condition unless the input waveform stays above the reference voltage for more than 50 percent of the time. When the waveform stays above the reference voltage for more than 50 percent of the time, the integrator will end up with a net value after each cycle and will have essentially the same value as if you were integrating the average of the input waveform. However, this is not precisely true because interruptions occur in the integration process as hereinafter explained. The net effect is that as each cycle of input vibration is applied to the decision circuit, the integrator will end up at a higher and higher value until it crosses through zero and actuates the output relay. Until the acceleration signal averages more than 50 percent of the time above the switching point, the integrator 22 will always end up in a reset condition after the applied vibration. This means that the accelerometer can be biased with linear acceleration by using earth's gravity right up to near the switching point. This makes it possible for the switching device to absorb very large values of G caused by shock and vibration without affecting the switching point. This is possible because the switching device realizes that with applied vibration and shock, it is not possible to spend more than half of the time above switching point and for that reason the integrator never ends up with a net value and switching never occurs until the average linear acceleration is above the switching point.

It is only when the decision circuit is spending more than substantially one-half of its time with the diode CR201 conducting and less than one-half of its time with CR202 conducting, that the integrator has any chance of progressing upwardly and passing through zero to actuate the zero comparator.

As the input acceleration signal causes the decision circuit 19 to spend more than 50 percent of its time above the reference voltage, the integrator will progress upwardly in the generation of a ramp function of voltage although not in a steady fashion, but rather in a zig-zag fashion. This is because the capacitor C201 is charged for a certain time and then discharged for a shorter length of time. For that reason, a charge gradually builds up on the capacitor C201 so that it is not necessary for the collector to start at zero voltage or substantially zero voltage each time the transistor Q202 is turned off.

When the collector voltage of the transistor Q202 passes through the zero line represented by the zero reference voltage on the base of transistor Q102 the zero comparator will be operated as hereinbefore described to cause operation of the relay 16.

From the foregoing, it can be seen that the integrator 22 serves as a type of a time delay to ensure that the acceleration is above the predetermined acceleration for a certain period of time before the contacts are operated.

By way of example, one switching device incorporating the present invention had the following components:

| | |
|---|---|
| Q101, Q102 and Q202 | Type 2N335. |
| Q201 | Type 2N327. |
| Q103 | Type 7570. |
| R101 | 5K. |
| R102 | 1.5K. |
| R103 | 82K. |
| R104 | 2.7K. |
| R105 | 18K. |
| R106 | 36K. |
| R107 | 1K. |
| R108 | 1K. |
| R109 | 5.1K. |
| R110 | 47K. |
| C101 | .001 microfarad. |
| C201 | 2.2 microfarads. |
| CR101 | Type 1N758. |
| CR102 | Type 1N756. |
| CR104, CR105, CR106, CR107, CR201 and CR202 | Type HD 6001. |

It was found that such a switching device would not actuate improperly due to the vibration or shock. It operated in the correct interval of time in the presence of the predetermined average of linear acceleration. The switching levels of the device were varied from 0.9 G to 1.5 G and the integrating time required to actuate the output relay was set for various times ranging from 0.2 to 1.5 seconds. It was found that the switching points could be set very accurately even though great amounts of vibration were present. Thus, for example, it was found that with the above accelerometer it was possible to have the accelerometer set to operate its contacts at 0.9 G of acceleration and not to have the switch actuated by the application of vibration or shock forces of 20 G's or more.

As hereinbefore explained, in FIGURE 6 we have shown a circuit diagram of the switching device which is designed to operate the relay 16 when the acceleration falls below the switching point for which the switching device has been calibrated. It is readily apparent that it may be desirable to provide such a switching device which is designed for operation so that the relay will be energized when the acceleration exceeds the switching point for which the device has been calibrated. Two embodiments for accomplishing an operation of this type are shown in FIGURES 7 and 8. Since it is only necessary to make slight changes in the decision circuit 19 of the circuit shown in FIGURE 6, only the modified decision circuit has been shown in FIGURES 7 and 8. It should be understood, of course, that the remaining portion of the circuitry shown in FIGURE 6 remains unchanged.

The primary change to be made in the decision circuit is to change the connections to the transistor Q201 so that operation occurs without sign inversion. As pointed out in the description of FIGURE 6, the signal polarity is inverted by the grounded emitter configuration of the transistor Q201.

In the embodiment shown in FIGURE 7, a grounded base configuration is utilized for the transistor Q201. The diode CR202 connects the base of the transistor Q201 directly to the reference line 42. The diode CR107 has been eliminated and diode CR106 is connected directly to the signal line 38. The diode CR201 has also been omitted. The diodes CR202 and CR106 form a diode comparator as hereinafter described.

Operation of this embodiment of the invention may now be briefly described as follows. When the acceleration on the accelerometer is zero, the voltages on lines 38 and 43 are identical. A high voltage is, therefore, applied by the line 38 to the diode CR106 to reverse bias it and to prevent current from flowing through it from the resistor R105. The current through the resistor R105, therefore, flows into the emitter of the transistor Q201. Since the voltage on line 43 is substantially above the voltage on line 42 to which the base of the transistor Q201 is connected through diode CR202, transistor Q201 will be turned on vigorously and will saturate itself and supply a full positive signal to the transistor Q202 through the resistors R201 and R202. Transistor Q202 will, therefore, be turned on into a reset condition identical to that described in the embodiment shown in FIGURE 6. Thus, it can be seen that the reset condition, that is, with transistors Q201 and Q202 turned on, results from a zero acceleration condition.

As the acceleration signal of the accelerometer increases, the voltage on line 38 increases in a negative direction from the positive reference voltage (18 volts) on the line 43. A decreasing voltage in a reverse direction will, therefore, be applied to the diode CR106 until the voltage on the diode CR106 decreases so that it is substantially equal to the voltage on the line 42 and there is zero reverse voltage on the diode CR106. There is a vary small voltage drop from the base to the emitter of the transistor Q201. As soon as there is zero reverse voltage on the diode CR106, the diode CR106 begins conducting and carries all of the current from the resistor R105 to the accelerometer. This, therefore, removes the current supply for the emitter of the transistor Q201 and, therefore, the transistor Q201 is turned off immediately upon establishing a zero reverse voltage condition on the diode CR106. Turning off the transistor Q201 removes the positive supply to transistor Q202 provided by the collector of the transistor Q201 to also turn off the transistor Q202.

Upon increasing acceleration and as the voltage on the line 38 increases in a negative direction and exceeds the voltage which is on line 42, the emitter of the transistor Q201 is pulled with this voltage. As the emitter of the transistor Q201 is pulled along with the voltage, so is the base circuit of the transistor Q201. Therefore, when the voltage on the one side of the diode CR106 is equal to the voltage applied to the diode CR202 by the line 42, the diode CR202 is in effect disconnected from the reference voltage 42 and prevents the transistor Q201 from being reverse voltaged.

The operation of the remainder of the circuit is identical to that described for FIGURE 6. It is, therefore, apparent from the foregoing that in FIGURE 7 is disclosed a device which will switch at a predetermined point with increasing acceleration, whereas the embodiment in FIGURE 6 switches upon reaching a predetermined switching point with decreasing acceleration.

In general, the primary difference between the embodiments in FIGURE 7 and the one shown in FIGURE 6 is that the transistor Q201 is operated as a grounded base amplifier rather than a grounded emitter amplifier so that there is an output current in the collector circuit of transistor Q201 for accelerations in excess of the reference signal in FIGURE 6 and an output current in the collector circuit of transistor Q201 for accelerations less than the reference signal.

Another modification of FIGURE 6 is shown in FIGURE 8 which utilizes the same diode comparator circuit which is utilized in FIGURE 6. However, in this case, the diode CR202 is connected to the emitter of the transistor Q201. The resistor R203 is connected to the line 43 rather than to the ground line 37. The base of the transistor Q201 is connected directly to the reference line 42. Resistor R105 and diodes CR106 and CR107 have been eliminated.

Operation of the embodiment shown in FIGURE 8 may now be briefly described as follows: Assuming that acceleration is zero, the voltage on line 38 is identical to the voltage on line 43. When this is the case, the voltage on line 38 is greater than the voltage applied to the cathode of diode CR202. A reverse voltage or bias is, therefore, applied to the diode CR201 to render it nonconducting. For that reason, all of the current from resistor R203 flows through diode CR202 into the emitter of the transistor Q201 which is operating in a grounded base configuration. The transistor Q201 is, therefore, turned on vigorously to apply a positive signal to the resistors R201 and R202 and to cause the transistor Q202 to be turned on. Therefore, both of the transistors Q201 and Q202 are in the reset condition as hereinbefore explained when acceleration is zero.

As the acceleration increases and the voltage on line 38 actually exceeds the voltage on the reference line 42, the current passing through the resistor R203 begins passing through the diode CR201 to the accelerometer. This removes the drive from the transistors Q201 and Q202 to cause the generation of the ramp voltage by the integrator 22 as hereinbefore described in conjunction with FIGURE 6.

As the output voltage from the accelerometer on the line 38 increases beyond the reference point determined by the voltage on the reference line 42, the diode CR202 is reverse voltaged or has a reverse voltage applied to it to prevent the transistor Q201 from being reverse voltaged by the acceleration signal. The operation of the remainder of the circuitry is identical to that described for FIGURE 6.

Although the circuitry in FIGURE 6 has been described in conjunction with the block diagram shown in FIGURE 3, the circuitry in FIGURE 6 can be readily altered to produce the circuits shown in FIGURES 1, 2, 4 and 5. For example, the circuit shown in FIGURE 1 can be created merely by removing the decision circuit 19 and the integrator 22 and utilizing the zero comparator 23 as the decision circuit 12 in FIGURE 1. This zero comparator, in reality, is also a decision circuit because it compares the input with zero and gives a yes or no answer as to whether or not the zero has been crossed. After removal of these two circuits, the conductor 38 can be connected directly to the diode CR104 to provide the switching device shown in FIGURE 1.

With respect to the block diagram shown in FIGURE 2, it would only be necessary to use the circuit just described for FIGURE 1 and place an RC filter in series with the accelerometer so that the output signal from the accelerometer is modified before it is supplied to the zero comparator which forms the decision circuit 12.

The circuit for the block diagram in FIGURE 4 would be similar to that of FIGURE 2 with the exception that a second order filter would be substituted for the RC filter. The circuit for FIGURE 5 would also be similar to that shown in FIGURE 3 with the exception that the zero comparator 23 would be removed and integrator 22 would be placed ahead of the decision circuit 19 rather than after it.

In the embodiments shown in FIGURES 1, 2, 4 and 5 it is readily apparent that, if desired, the switching device can be made to operate upon crossing a predetermined switching point, by decreasing acceleration or by increasing acceleration merely by making certain minor rearrangements as shown in the circuit diagrams in FIGURES 6, 7 and 8. The same would be true for causing a switching device to actuate upon crossing a predetermined velocity by a decreasing velocity or an increasing velocity.

It is apparent from the foregoing that I have provided a new and improved switching device which will switch accurately at a predetermined acceleration or at a predetermined velocity by either increasing acceleration and velocity or decreasing acceleration and velocity. Such switching operations are readily performed independent of any shock and vibratory forces applied to the switching device. Although certain of the circuitry shown has utilized solid state components, it is readily apparent that, if desired, other components such as vacuum tubes can be utilized without departing from the scope of the present invention.

I claim:

1. In a switching device, an accelerometer for measuring acceleration, a decision circuit connected to the accelerometer, the decision circuit including means capable of assuming conducting and nonconducting states, means for supplying a reference to said means capable of assuming conducting and nonconducting states representing a predetermined switching point, said means capable of assuming conducting and nonconducting states assuming one of said states when the output from said accelerometer is on one side of the reference and assuming the other of said states when said output from the accelerometer passes the reference, integrating means connected to said decision means and serving to generate a ramp function when said means capable of assuming conducting and nonconducting states is in said other of said states and zero comparator means for comparing said ramp function with said reference voltage to determine when said ramp function passes said reference and switching means actuated by said zero comparator as said ramp function passes said reference.

2. A switching device as in claim 1 together with means for preventing the application of a reverse bias to said means capable of assuming conducting and nonconducting states.

3. A switching device as in claim 2 wherein said means capable of assuming conducting and nonconducting states is a transistor arranged in a grounded emitter configuration.

4. A switching device as in claim 2 wherein said means capable of assuming conducting and nonconducting states is a transistor arranged in a grounded base configuration.

5. In a switching device, an accelerometer for measuring acceleration, a decision circuit connected to the accelerometer, the decision circuit including comparator means in the form of a pair of diodes arranged to conduct in opposite directions, means connecting the output signal voltage of the accelerometer to one of the diodes, means supplying a reference voltage to the other of the diodes, means for establishing a complete circuit for the diodes so that the diode with the higher voltage applied thereto conducts current and the other diode with the lower voltage applied thereto does not conduct current, integrating means connected to said decision means serving to generate a ramp function when the output of said accelerometer passes the reference, zero comparator means for comparing said ramp function with said reference to determine when said ramp function equals said reference and switching means actuated by said zero comparator as said ramp function passes said reference.

6. A switching device as in claim 5 wherein said decision circuit includes inverting amplifier means to permit the switching device to be used for actuating the switching means from a decreasing acceleration.

7. A switching device as in claim 5 wherein said decision circuit includes a noninverting amplifier means to permit said switching device to actuate switching means from an increasing acceleration.

8. A switching device as in claim 5 wherein said decision circuit includes a transistor having base, collector and emitter elements with the base of the transistor being connected to the diode to which the reference voltage is connected, the transistor serving to couple the reference voltage to said diode, and wherein the other diode is directly connected to the output of the accelerometer.

9. A switching device as in claim 5 wherein said decision circuit includes a transistor having base, collector and emitter elements and in which the base of the transistor is connected to the diode to which the reference is connected and in which the emitter is connected to the diode to which the output of the accelerometer is connected, the transistor serving to couple the two diodes.

10. A switching device as in claim 5 wherein the decision circuit includes a transistor having base, collector and emitter elements and in which the emitter element is connected to the diode which is connected to the reference and wherein the other diode is directly connected to the output from the accelerometer.

11. In a switching device, an accelerometer for measuring acceleration, a decision circuit connected to the accelerometer, the decision circuit including a pair of diodes arranged to conduct in opposite directions, means connecting the output of the accelerometer to one of the diodes, means supplying a reference to the other of the diodes, means for establishing a complete circuit for the diodes, the diode with the higher voltage applied thereto conducting current and the other diode with the lower voltage applied thereto being nonconducting, said means supplying a reference including means connected to said other diode capable of assuming conducting and nonconducting states, said means being normally nonconducting when current is not passing through said other diode and being conducting when current is passing through said other diode, integrating means connected to said decision means and serving to generate a ramp function when the output from the accelerometer passes the reference, and zero comparator means for comparing said ramp function with said reference to determine when said ramp function passes said reference, and switching means actuated by said zero comparator as said ramp function passes said reference.

12. In a switching device, a servo accelerometer including means for supplying a restoring current, a decision circuit connected to the accelerometer and comprising first and second diodes, means connecting the output of the accelerometer to the first diode, a transistor having base, emitter and collector elements, means connecting the base element to the second diode, means for biasing the transistor to place a predetermined reference voltage on the base of the transistor, means for forming a path for current flow from the first and second diodes, the diodes facing in opposite directions so that current can flow only in one diode at a time, an integrator circuit connected to the decision circuit, the integrator circuit consisting of a transistor having base, collector and emitter elements, a capacitor connected between the collector and base elements of the last named transistor, means connecting the base element of said last named transistor to the collector of the transistor in the decision circuit, and zero comparator means connected to the integrator circuit, the zero comparator means comprising first and second diodes, the diodes facing in opposite directions so that the current can only flow in one diode at a time, means for establishing current flow through the diodes, means for applying said reference voltage to one of the diodes, and means for connecting the other of the diodes to the collector of said last named transistor, and switching means connected to the zero comparator.

13. A switching device as in claim 12 together with amplifier means connected between the zero comparator and the switching means.

14. A switching device as in claim 12 together with means connected to the accelerometer permitting an increase in the restoring current flow in the accelerometer when the output of the accelerometer exceeds a value which is equal to the output of the reference means, said last named means including a serially connected resistor and diode.

15. A switching device as in claim 12 together with a power supply and regulator, said power supply and regulator including a transistor having base, collector and emitter elements, a Zener diode connected to the base of the transistor, a Zener diode connected to the emitter of the transistor, a D.-C. voltage supply, and means connecting the D.-C. voltage supply to the collector of the transistor.

16. In a switching device, means for measuring acceleration producing an output voltage, reference means producing a voltage representing a predetermined switching point, decision means for determining when the output voltage from the means for measuring acceleration reaches and passes the output voltage of the reference means, an integrator connected to the output of the decision means, a zero comparator connected to the output of the integrator, and switching means connected to the output of the zero comparator.

17. A switching device as in claim 16 wherein the means for measuring acceleration is a servo accelerometer including means for supplying a restoring current together with means connected to the accelerometer for permitting an increase in current flow in the accelerometer when the output voltage of the accelerometer exceeds a value which is equal to the voltage output of the reference means.

References Cited in the file of this patent
UNITED STATES PATENTS

| | | |
|---|---|---|
| 2,554,512 | Varian | May 29, 1951 |
| 2,613,071 | Hansel | Oct. 7, 1952 |
| 2,726,074 | Ketchledge | Dec. 6, 1955 |
| 2,775,724 | Clark | Dec. 25, 1956 |
| 3,012,180 | Finvold | Dec. 5, 1961 |
| 3,036,241 | Zelina | May 22, 1962 |